C. L. TAYLOR.
ELECTRIC CONTROLLER.
APPLICATION FILED FEB. 21, 1908.
906,576.
Patented Dec. 15, 1908.
7 SHEETS—SHEET 4.
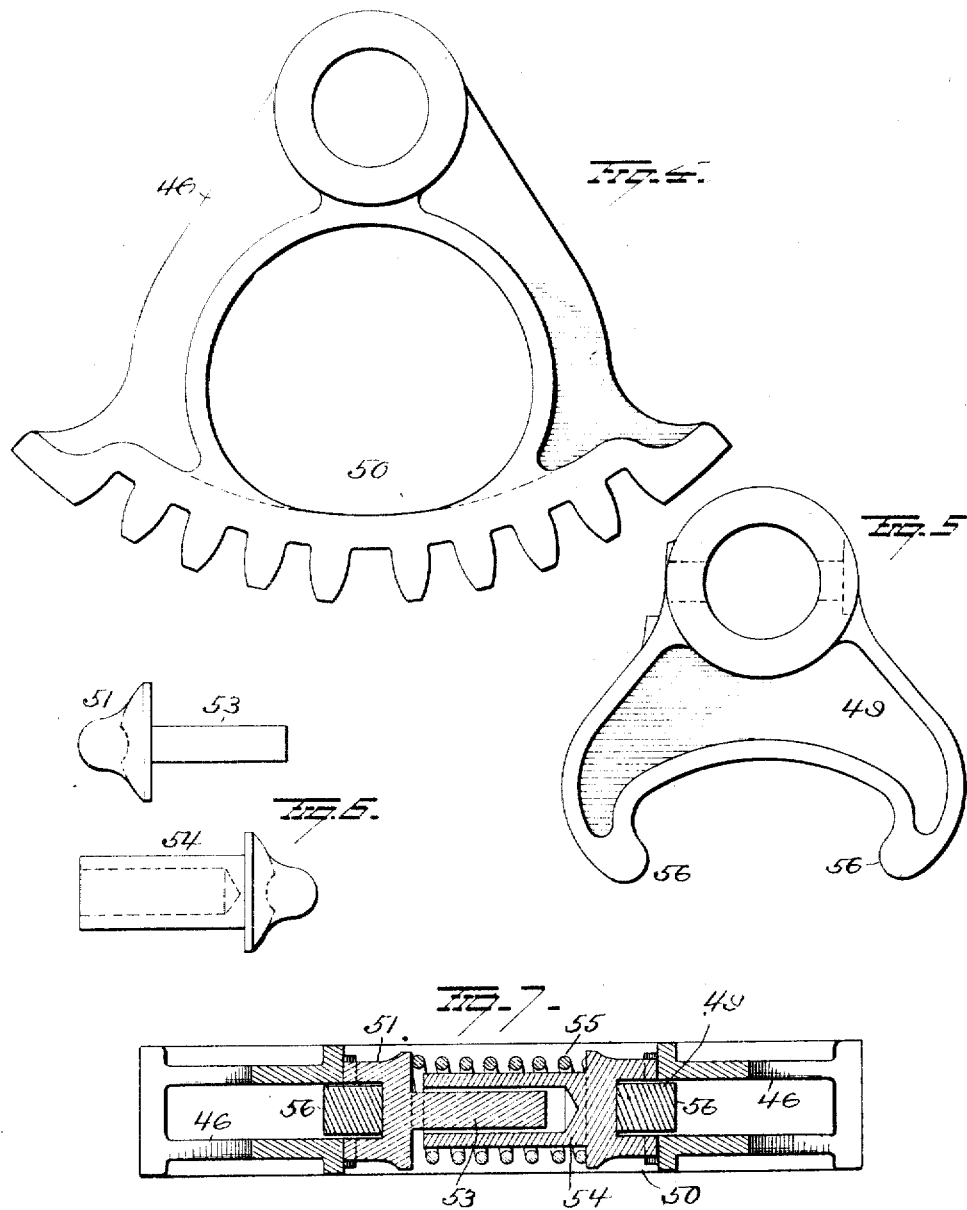
WITNESSES
E. J. Nottingham
G. F. Downing
INVENTOR
C. L. Taylor
By H. A. Seymour
Attorney

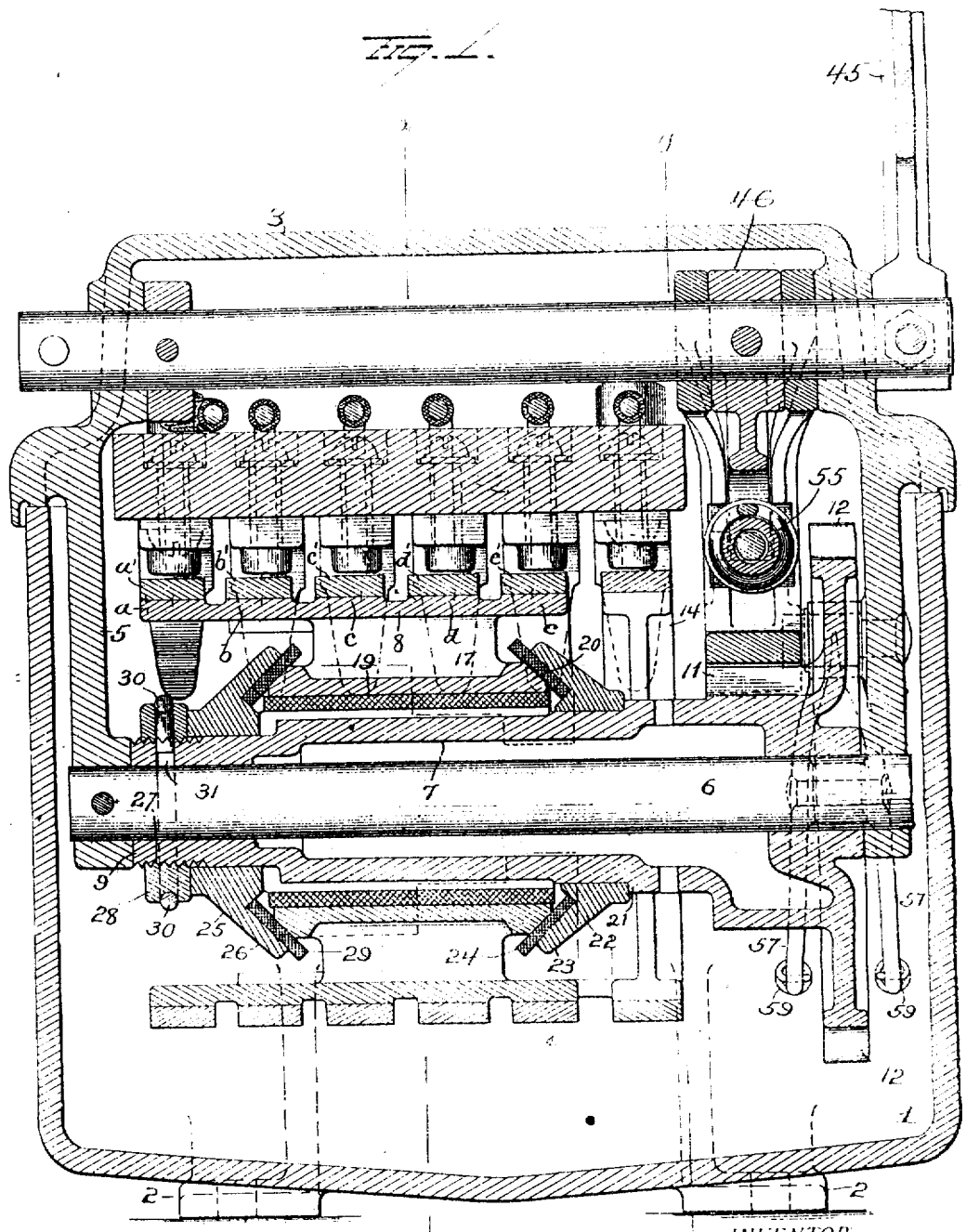

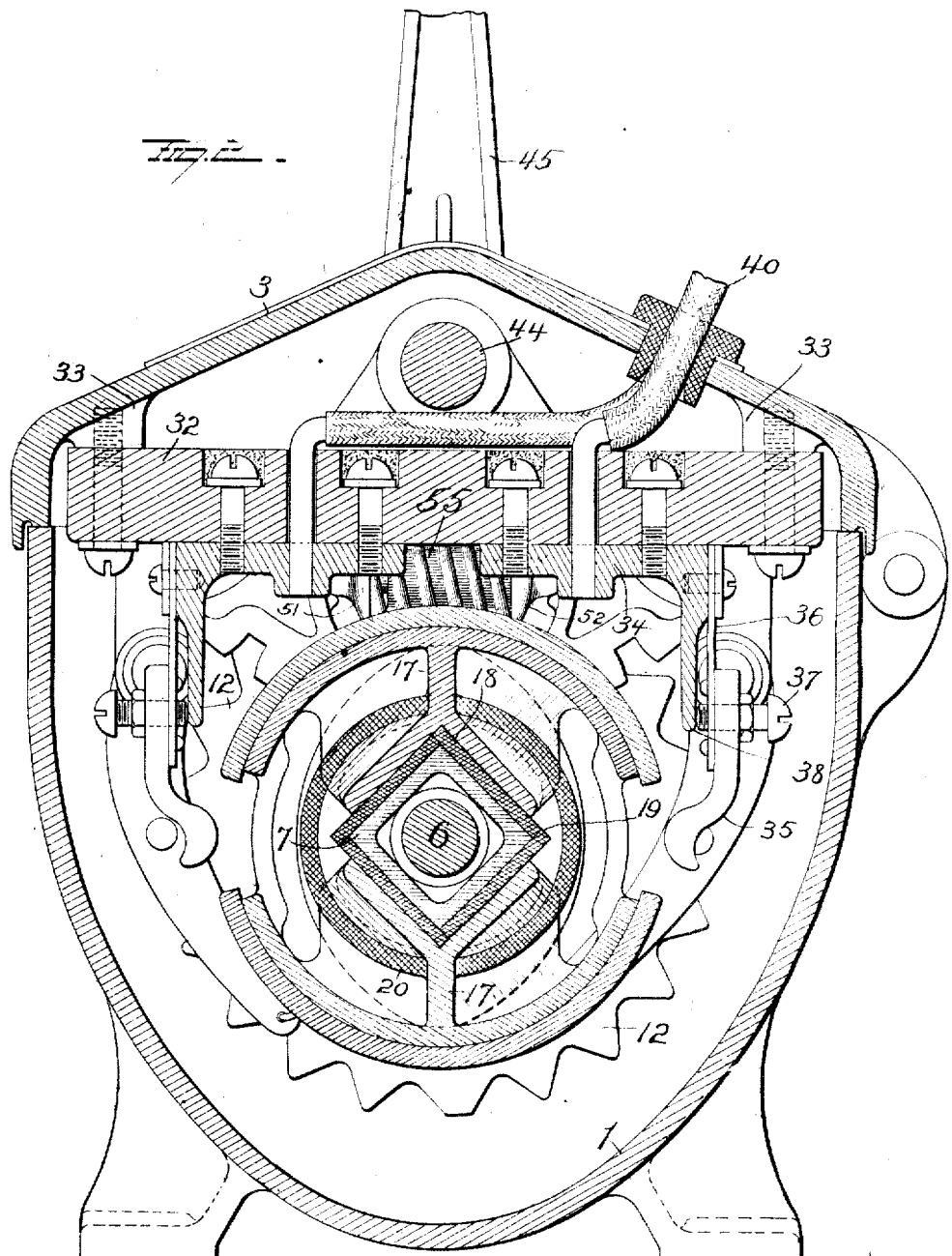

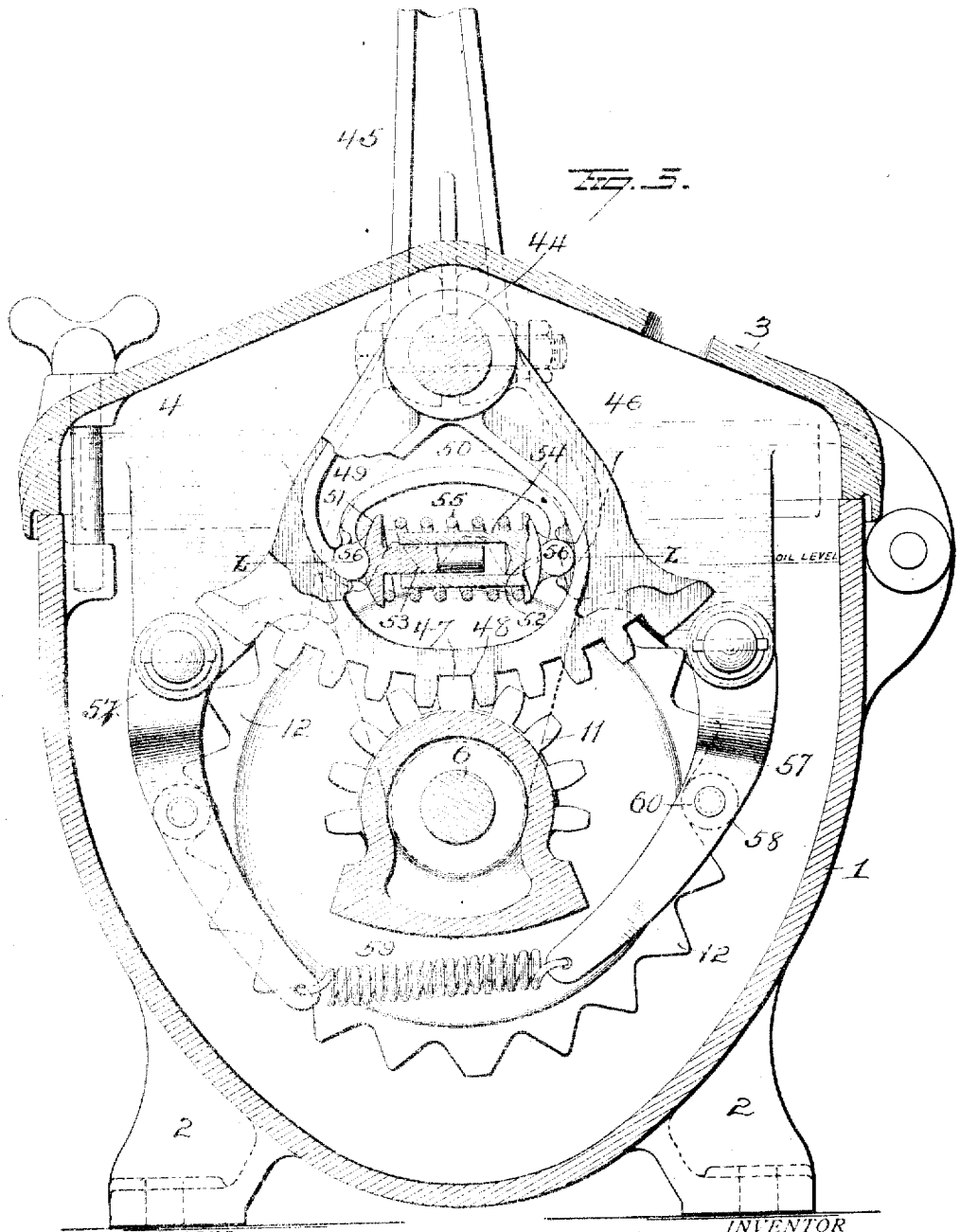

C. L. TAYLOR.
ELECTRIC CONTROLLER.
APPLICATION FILED FEB. 21, 1908.

906,576.

Patented Dec. 15, 1908
7 SHEETS—SHEET 5.

WITNESSES
E. J. Nottingham
G. F. Downing

INVENTOR
C. L. Taylor
By H. G. Seymour
Attorney

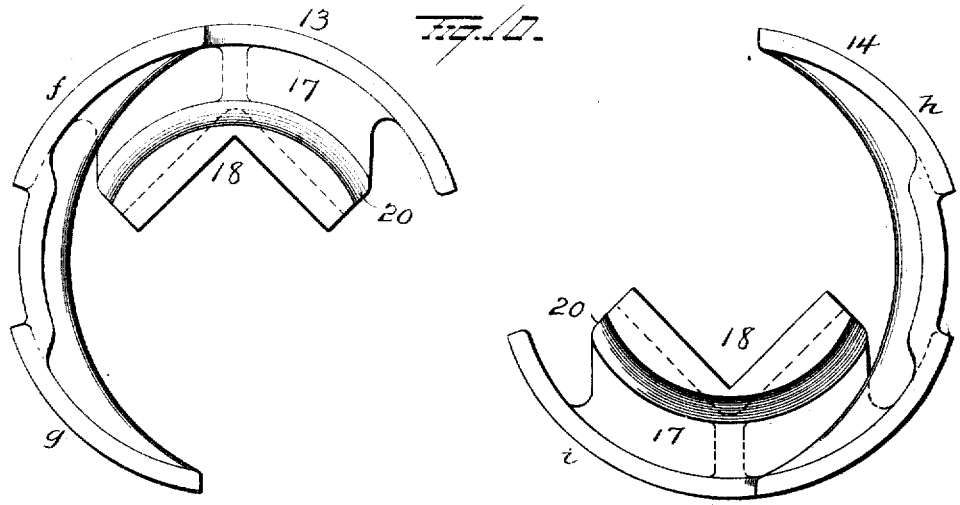
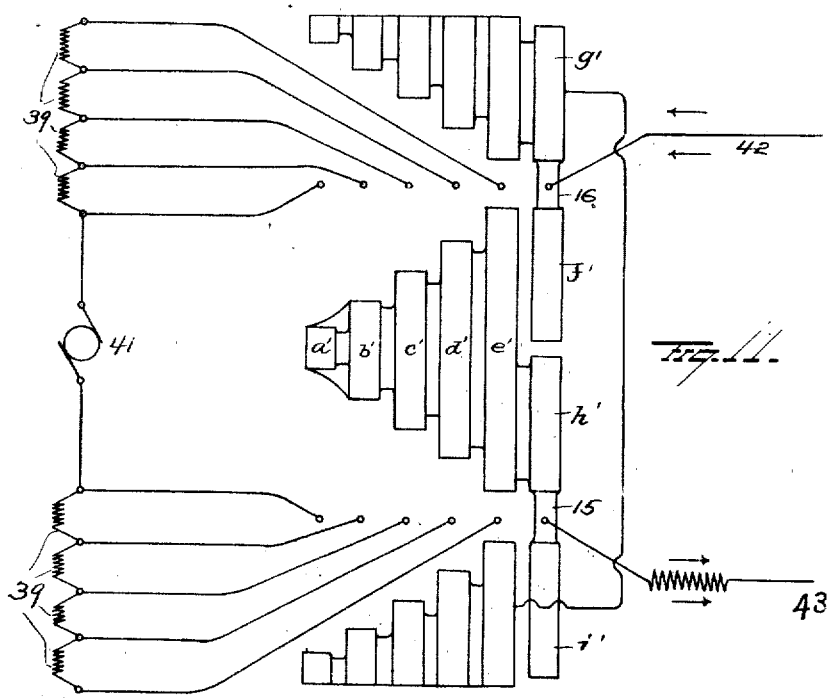

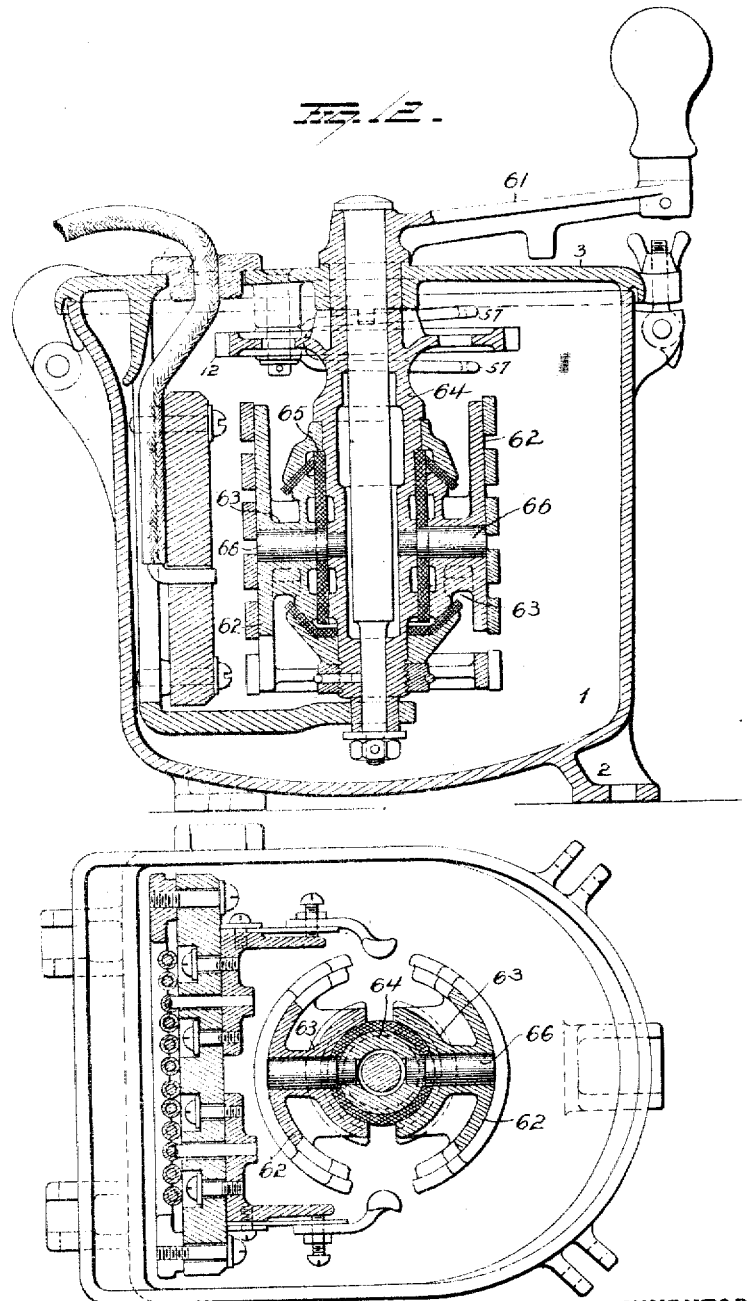

UNITED STATES PATENT OFFICE.

CLARENCE L. TAYLOR, OF ALLIANCE, OHIO, ASSIGNOR TO THE MORGAN ENGINEERING COMPANY, OF ALLIANCE, OHIO.

ELECTRIC CONTROLLER.

No. 906,576.            Specification of Letters Patent.            Patented Dec. 15, 1908.

Application filed February 21, 1908. Serial No. 417,177.

*To all whom it may concern:*

Be it known that I, CLARENCE L. TAYLOR, of Alliance, in the county of Stark and State of Ohio, have invented certain new and useful Improvements in Electric Controllers; and I do hereby declare the following to be a full, clear, and exact description of the invention, such as will enable others skilled in the art to which it appertains to make and use the same.

This invention relates to improvements in electric controllers, and more particularly to such as are adaptable for use in controlling the operation of electric motors for overhead traveling cranes and kindred apparatus,—the object of the present invention being to provide an electric controller which shall be of compact construction and in which all of the working parts shall be submerged in oil.

A further object is to so construct and arrange the contact devices that the size of the drum can be reduced to a minimum and still obtain a wide range of contacts.

A further object is to provide a simple and compact construction of contact drum.

A further object is to provide improved and simple constructions and arrangements of the various details of construction, to the end that the controller shall be accurate in operation and effectual in the performance of all the functions required of it.

With these objects in view the invention consists in certain novel features of construction and combinations of parts as hereinafter set forth and pointed out in the claims.

Figure 8:
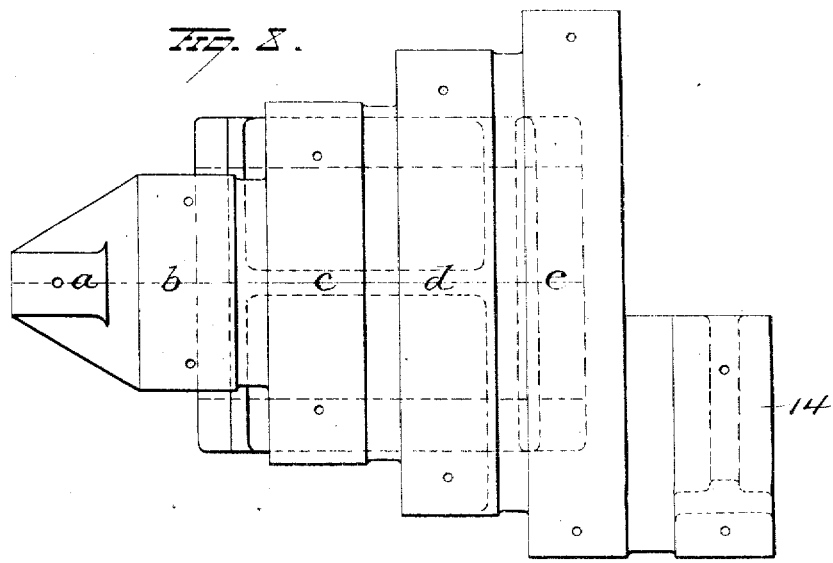
Figure 9:
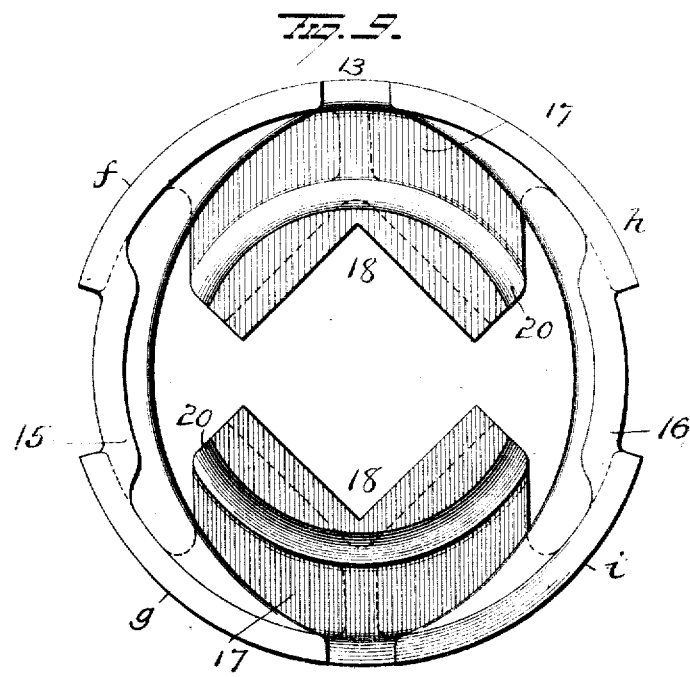

In the accompanying drawings, Figure 1 is a longitudinal sectional view of an electric controller embodying my improvements. Fig. 2 is a vertical transverse sectional view on the line $x$—$x$ of Fig. 1. Fig. 3 is a vertical transverse sectional view on the line $y$—$y$ of Fig. 1. Figs. 4, 5, 6 and 7 are detail views illustrating devices interposed between the operating lever and the contact drum. Fig. 8 is a face view of a portion of the contact drum. Fig. 9 is an end view of contact drum. Fig. 10 illustrates the two parts of the contact drum, separated. Fig. 11 is a diagram illustrating the electric circuits. Figs. 12 and 13 are views illustrating certain modifications.

1 represents an inclosing casing for the working parts and adapted to contain oil or other fluid for the purpose of quenching any sparks which might occur between contacts. The casing is provided with suitable feet 2, and with a hinged cover 3,—the latter serving to support all of the working parts of the machine, so that they can be readily exposed for repair or inspection when the cover is raised. The cover is normally secured in place by means of a suitable locking device 4.

On respective ends, the cover is provided with hangers 5 which depend within the casing and have rigidly secured to their lower ends a fixed shaft 6. On this shaft the tubular hub 7 of a contact drum 8 is mounted to rotate. The ends of this hub are made with cylindrical portions or sleeves 9—10 mounted on the shaft, while the intermediate portion of said hub is made angular, preferably square in cross-section, as shown in Fig. 2. One end of the hub 7 is enlarged and has cast integral therewith, a segmental pinion 11 and a notched or star wheel 12,—the functions of which will be hereinafter described. The contact drum 8 comprises two skeleton members 13—14, each having faces $a$, $b$, $c$, $d$, $e$, varying in size progressively, and to these faces, contact shoes $a'$, $b'$, $c'$, $d'$, $e'$, are secured. The members 13—14 of the drum are also provided, at one end, with curved arms 15, 16, respectively,—the arm on one member of the drum overlapping the other member of the drum, as shown in Fig. 9. The arm 15 is provided with faces $f$, $g$, spaced apart, and to these faces, contact shoes $f'$, $g'$, are secured. The arm 16 of the other drum member is similarly made with faces $h$, $i$, to which contact shoes $h'$, $i'$, are secured.

The contact drum members are provided with spiders 17, having angular recesses 18 which coöperate to conform to the angular shape of the intermediate portion of the hub 7. Between the faces of the recessed portions of the spiders 17, and the hub 7, suitable material 19 is located for the purpose of insulating the contact drum from the hub 7. The spider of each drum member is provided at respective ends with curved shoulders 20. The hub 7 is provided in proximity to the enlarged end portion thereof, with an annular shoulder 21 which constitutes an abutment for a ring 22 which encircles said hub. The ring 22 is provided with an annular flange 23 which overhangs the curved shoulders 20 at one end of the drum spiders, and between the flanges 23 and shoulders 20, insulating material 24 is disposed. A similar ring 25 is located on the hub 7 near the opposite end thereof and provided with a flange 26 which overhangs the shoulders 20 at that end of the drum spiders. The hub 7 is threaded, as at 27, for the reception of a nut 28 which is made to abut against the ring 25. Insulating material 29 is disposed between the flange of ring 25 and the hub spiders. From the construction and arrangement of parts above described, it will be observed that the contact drum is clamped on the hub 7 between the rings 22—25,— from both of which and the hub, said drum is insulated. In order to retain the drum in clamped position on the hub, a pin 30 is passed through a hole in the nut 28 and made to enter a hole 31 in the hub 7.

A block 32 of slate or other suitable non-conducting material, is secured to lugs 33 depending from the cover 3. To this block, two series of angular brackets 34 are secured, for the accommodation of two series of contact fingers 35, one series of such fingers being located at each side of the contact drum, and adapted to coöperate with the contact shoes on the drum 8. Each contact finger 35 is carried by a spring 36 secured at its upper end to one of the brackets 34. For adjusting contact fingers 35 relatively to the contact drum, a screw 37 is passed through each finger and engages the depending arm 38 of the adjacent bracket 34.

Resistance elements 39 may be located at any convenient place, more or less distant from the controller and are connected, by means of suitable conductors 40, with the brackets 34 which carry the contact fingers 35. In the diagram, Fig. 11, the resistance elements are shown arranged in two series connected, respectively, with the contact fingers of the respective series of fingers, and also connected in circuit with an electric motor 41. In said diagram, the arm 16 of the contact drum is shown electrically connected with the member of the contact drum from which the arm 15 projects, and the leading-in wires 42—43 from any convenient source of electrical energy, are connected with the contact fingers which coöperate with the shoes on the arms 15—16 of the drum members.

Should the contact drum be turned in one direction from the position indicated in the diagram, the circuit will be closed through both series of resistance elements and the motor. As the operator continues to turn the drum, the resistance elements will be excluded from the circuit, step-by-step, as will be readily understood, and during the return rotation of the drum, the resistance will be gradually included into the circuit until the normal position of the drum is reached, when the circuit will be opened. Should the drum be rotated in the opposite direction from its normal position, the current will enter the motor in the reverse direction. From an examination of the diagram, Fig. 11, it will be apparent, that the arms 15—16 of the respective drum members, coöperate with the drum-members and two of the contact fingers, in such manner as to produce a reversing switch,—so that when the drum is turned in one direction from its normal position, the circuit will be closed through the motor in one direction, and that when the drum is turned from its normal position in the opposite direction, the circuit through the motor will be reversed. The coöperation of the drum with the several contact fingers, can be caused therefore, to effect the operation of the variable resistance and also the reversing of the motor. It is important that the step-by-step rotation of the drum shall be accurate, and that the contact devices shall be effectually prevented from dwelling between two consecutive points. For thus operating the contact drum, the devices now to be described will be employed.

A shaft 44 is mounted in suitable bearings in the upper portion of the cover 3 and is provided at one end with an operating lever 45. A toothed segment 46 is mounted loosely on the shaft 44 and meshes with the segmental pinion 11,—the latter being provided with a centrally located irregular tooth 47 to enter a similarly shaped notch 48, in the segment 46, for insuring the proper matching of the pinion and segment.

In order to assist in avoiding the possibility of "dwell" between contacts, the operating lever 45 is connected with the segment 46 in the following manner: The segment 46 is bifurcated and, as above stated, is loosely mounted on the shaft 44. Between the members of the bifurcated segment, a yoke or bracket 49 is rigidly secured to the shaft 44. The segment 46 is made with an opening 50 and against the opposite walls of this opening, the heads 51—52 of telescopic members 53—54 bear. The heads 51—52 are maintained normally in contact with the walls of the segment, by means of a spring 55 which encircles the member 54 and bears at its respective ends against said heads. The yoke or bracket 49 is made with projections 56 which enter notches in the heads 51—52. By means of this construction, a yielding connection is afforded between the operating lever 45 and the segment 46. To further insure the proper step-by-step rotation of the contact drum, bifurcated arms 57 pivotally attached to one of the hangers 5, are made to embrace the star wheel 12 at respective sides thereof, and each of these arms carries a roller 58 to engage the star wheel, said rollers being caused to enter the notches of said wheel, by means of springs 59 secured at their respective ends to the respective arms 57. Thus it will be seen that the engagement of the rollers 58 with the star-wheel 12 will insure the proper step-by-step rotation of the drum and prevent "dwell" between contacts. At one point on the star-wheel, an extra deep notch 60 is provided, which marks the "off" position of the controller.

In the construction shown in Figs. 12 and 13 the contact drum is disposed in a vertical position and operated by means of a crank 61 connected with the hub of the contact drum. The drum members 62 here shown, are provided with spiders 63 having curved inner faces to conform to the cylindrical shape of the tubular hub 64 and are separated therefrom by means of insulating material 65. The drum members are secured to the hub 64 by means of pins 66.

Various other changes might be made in the details of construction of my invention without departing from the spirit thereof or limiting its scope and hence I do not wish to restrict myself to the precise details herein set forth.

Having fully described my invention what I claim as new and desire to secure by Letters-Patent, is,—

1. In an electric controller, the combination with a casing adapted to contain oil, and a cover having hinged connection with said casing, of a contact drum, contact fingers, and operating mechanism, all supported by and removable with said hinged cover.

2. In an electric controller, the combination with a casing and a hinged cover therefor, of hangers depending into the casing from said cover, a contact drum supported by said hangers, contact fingers at respective sides of the drum, supported by the cover, and operating devices for the drum, said operating devices having mountings in the cover.

3. In an electric controller, the combination with a casing, a cover hinged at one side thereto, and hangers depending from the cover and entering the casing, of a shaft secured to said hangers, a contact drum mounted on said shaft, contact fingers supported by the cover at respective sides of the drum, a shaft passing through the cover, means for transmitting motion from said last-mentioned shaft to the contact drum, and means for manually operating said last-mentioned shaft, all of said devices being removable from within the casing by the raising of the cover.

4. In an electric controller, the combination with a shaft, of a hub thereon, provided with an integral segmental pinion, a contact drum embracing said hub, means for securing the drum to the hub, contact fingers coöperating with the contact drum, a toothed segment meshing with the segmental pinion, an operating lever and a yielding connection between said lever and toothed segments.

5. In an electric controller, the combination with a shaft, of a hub mounted thereon, a star-wheel integral with one end of said hub, a contact drum secured to the hub, means for turning said hub and drum, contact fingers coöperating with the drum, pivoted arms embracing the star-wheel, a spring connecting said arms, and means on said arms engaging the star-wheel.

6. In an electric controller, the combination with a contact drum, contact fingers, and means for supporting said drum and fingers, of a notched wheel movable with said drum, pivotally supported bifurcated arms embracing said notched wheel at respective sides thereof, a roller disposed between the members of each bifurcated arm and engaging the notched wheel, a spring connecting the free ends of said arms, and means for turning the drum and notched wheel.

7. In an electric controller, the combination with a contact drum, contact fingers, and means for supporting said drum and fingers, of a pinion and a star-wheel movable with said drum, pivoted arms, means on said arms engaging the notched wheel, a spring connecting said arms, an operating lever, a toothed segment meshing with said pinion, and a yielding connection between said operating lever and segment.

8. In an electric controller, the combination with a contact drum, contact fingers and means for supporting said drum and fingers, of a pinion movable with the drum, an operating shaft, a toothed segment mounted loosely on the operating shaft and meshing with said pinion, telescopic members engaging the toothed segment, a spring tending to force said telescopic members outwardly, and a yoke or bracket secured to the operating shaft and engaging said telescopic members.

9. In an electric controller, the combination with supporting means, of a fixed shaft, a hub mounted thereon and provided at one end with a pinion and a notched wheel cast integral with said hub, a contact drum secured to said hub, contact fingers coöperating with said drum, a toothed segment meshing with said pinion, means for operating said segment, and a spring actuated arm coöperating with the notched wheel.

10. In an electric controller, the combination with a hub, of a two-part contact drum embracing the same, and rings on the hub and clamping the drum between them.

11. The combination with a hub, of a two-part contact drum, each having a spider partially embracing the hub, clamping rings on the hub, each coöperating with the spiders of both parts of the drum and securing the same to the hub.

12. The combination with a hub having an angular portion, of a two-part contact drum, each having a spider provided with faces to conform to the angular portion of the hub, and each spider having a curved shoulder at one end, clamping rings on the hub and coöperating with the curved shoulders at the ends of the spiders, and insulating means between the hub and spiders and between the spiders and clamping rings.

13. The combination with two series of contact fingers, of a contact drum disposed between them and comprising two members, each having contact surfaces for contact fingers, and each member of the drum having an arm overlapping the other member, said arms having contact surfaces for contact fingers, means for connecting said contact fingers in circuit with resistance elements and a source of electric energy, said drum and contact fingers coöperating to constitute a variable resistance controller and a reversing switch.

In testimony whereof, I have signed this specification in the presence of two subscribing witnesses.

CLARENCE L. TAYLOR.

Witnesses:
FRED E. FARMER,
D. W. PELL.